United States Patent [19]

Chihara et al.

[11] 4,234,153
[45] Nov. 18, 1980

[54] DEVICE FOR MOUNTING A MIRROR ON AN AUTOMOBILE PANEL

[75] Inventors: Takeshi Chihara; Masanori Kono, both of Hiroshima, Japan

[73] Assignees: Delta Kogyo Co., Ltd.; Toyo Kogyo Co., Ltd., both of Hiroshima, Japan

[21] Appl. No.: 41,782

[22] Filed: May 23, 1979

[30] Foreign Application Priority Data

May 26, 1978 [JP] Japan .................. 53-71993[U]

[51] Int. Cl.³ .................................................. B60R 27/00
[52] U.S. Cl. ............................. 248/475 B; 248/548
[58] Field of Search .................. 248/475 B, 160, 600, 248/75, 548, 27.1; 280/762; 404/11

[56] References Cited

U.S. PATENT DOCUMENTS

| | | | |
|---|---|---|---|
| 1,313,616 | 8/1919 | Walsh | 248/160 X |
| 1,526,742 | 2/1925 | Chapel | 404/11 |
| 1,590,421 | 6/1926 | Coffman | 248/160 X |
| 1,599,986 | 9/1926 | Chapel | 248/160 X |
| 2,272,688 | 2/1942 | Catron | 248/27.1 |
| 2,724,996 | 11/1955 | O'Shei | 248/160 X |
| 2,914,988 | 12/1959 | O'Shei | 248/160 X |
| 3,188,913 | 6/1965 | O'Shei | 248/475 B |
| 3,473,773 | 10/1969 | Meyer | 248/475 R X |
| 4,067,528 | 1/1978 | Motting | 248/160 X |

FOREIGN PATENT DOCUMENTS

| | | | |
|---|---|---|---|
| 2605297 | 8/1977 | Fed. Rep. of Germany | 280/762 |
| 803995 | 11/1958 | United Kingdom | 248/475 B |
| 1256045 | 12/1971 | United Kingdom | 248/475 B |
| 1520524 | 8/1978 | United Kingdom | 248/475 B |

*Primary Examiner*—J. Franklin Foss
*Attorney, Agent, or Firm*—Fleit & Jacobson

[57] ABSTRACT

Device for mounting a mirror on an automobile panel. The mirror is supported on one end of a stay, the other end of the stay being seated on a seat disc attached to the panel. Beneath the seat disc, there is a support plate which is also attached to the panel. A holding lever is removably connected at one end to the other end of the stay and extends through the seat disc, the support plate and the panel. A coil spring is provided to bias the stay downwards so that the stay is held on the seat disc. The arrangement is such that all parts of the device can be assembled totally from one side of the panel.

5 Claims, 6 Drawing Figures

FIG. 1
FIG. 2
FIG. 3
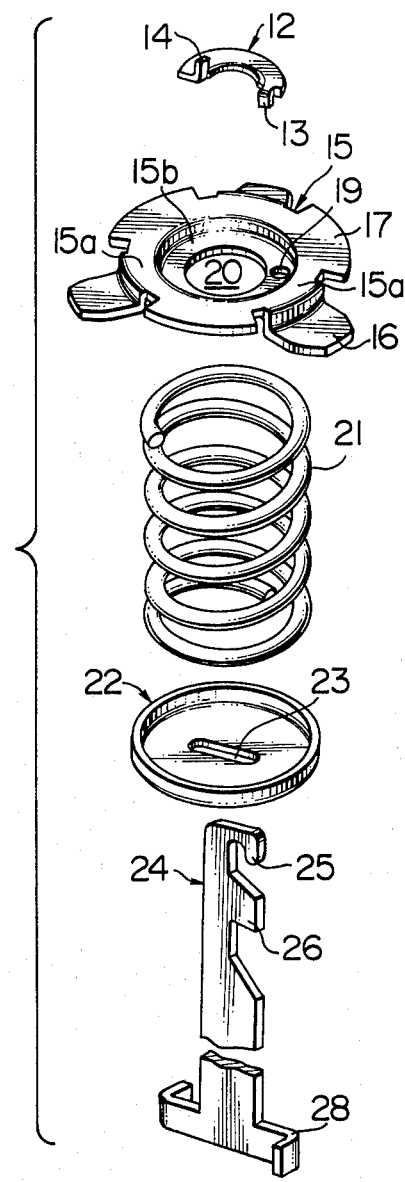
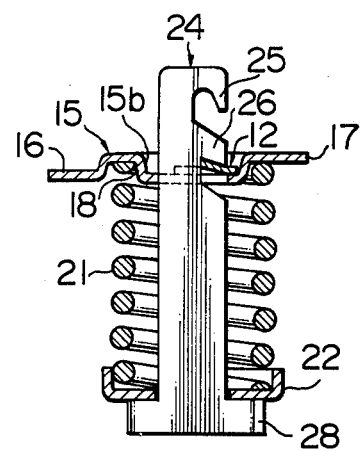
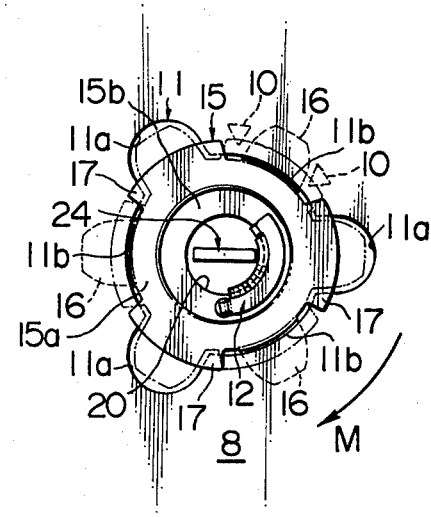

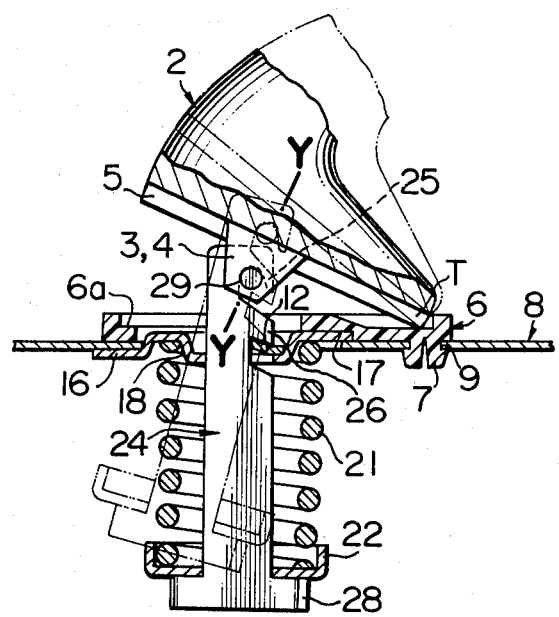
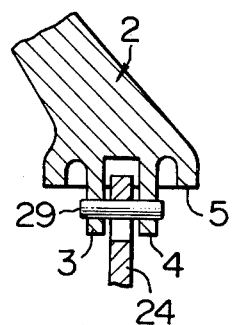
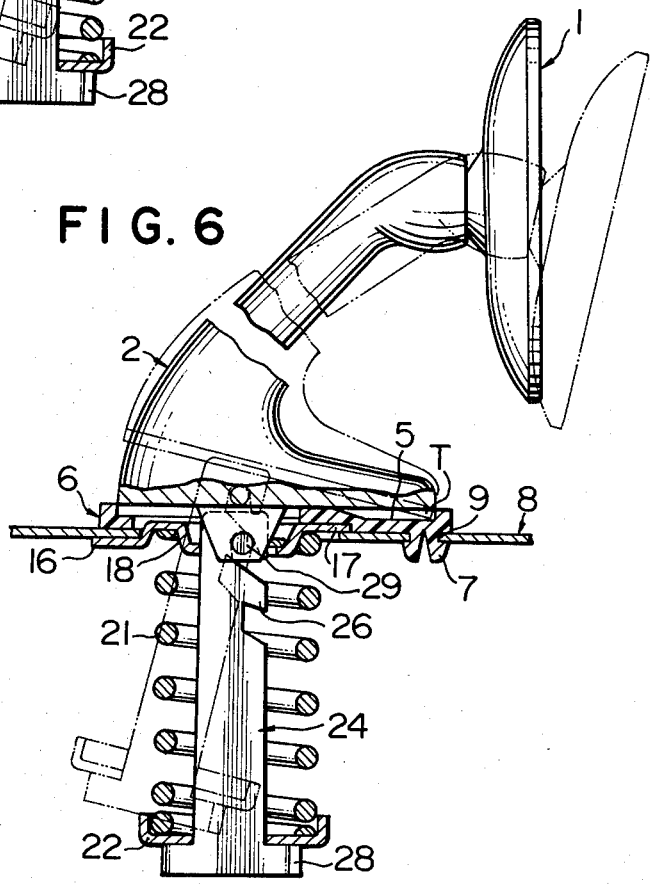

DEVICE FOR MOUNTING A MIRROR ON AN AUTOMOBILE PANEL

The present invention relates to automobile mirror structures and more particularly to mounting mechanisms for automobile mirrors. The present invention is particularly suitable for application to automobile back mirror structures which are mounted on fender panels but it may well be applied to other automobile mirror structures such as room mirrors and side mirrors adapted to be mounted on automobile doors.

In conventional mechanisms for mounting automobile mirrors, some of the parts have to be attached to the inner surfaces of the panels on which the mirrors are to be mounted. In case of back mirrors, for example, inconveniencies have been encountered in the conventional mechanisms in that the mirrors cannot be mounted on the fender panels after mud flaps have been attached to the inner surfaces of the panels.

It is therefore an object of the present invention to provide automobile mirror mounting mechanisms in which all parts can be attached from one side of the panels.

Another object of the present invention is to provide mechanisms for mounting mirrors in such a manner that the mirrors can yield when they are subjected to external forces.

According to the present invention, the above and other objects can be accomplished by a mechanism for mounting a mirror on a panel, said mechanism comprising stay means having one end supporting the mirror, stay seat means adapted to be placed on one side of the panel and providing a seat for the other end of the stay means, support means having means engageable with said panel at the other side thereof, holding lever means having one end removably connected with said other end of the stay means and extending through said stay seat means, said panel and said support means, resilient biasing means between said holding lever means and support means to bias the holding lever means so that the stay means is forced against the stay seat means to hold the stay means on the stay seat means, said engageable means of said support means being in the form of at least one radially outwardly extending lug, said panel having opening means formed with at least one peripheral cut-off adapted for passing said lug therethrough so that the support means can be placed in position by passing it through said opening means in said panel with said lug aligned with the peripheral cut-off in the opening means and rotating it to have the lug engaged with said other side of the panel. In a preferable mode of the present invention, the support means is provided with at least one segmental flange which is offset from said lug in a direction perpendicular to the support means by a distance corresponding to thickness of the panel, whereby the support means can be attached to the panel in assembling operation by having the panel held between the lug and the flange. The support means may preferably have a retractable finger which is adapted to be engaged with a cut-off formed in said holding lever means so that the holding lever means is temporarily assembled with the support means with the resilient biasing means in compressed condition.

The above and other objects and features of the present invention will become apparent from the following descriptions taking reference to the accompanying drawings, in which;

FIG. 1 is an exploded perspective view showing a portion of the mirror mounting mechanism in accordance with one embodiment of the present invention;

FIG. 2 is a sectional view showing the parts in FIG. 1 in a temporarily assembled position;

FIG. 3 is a plan view showing the manner of installing the support plate;

FIG. 4 is a sectional view showing the manner of installing the mirror stay to the holding lever;

FIG. 5 is a sectional view taken along the line Y—Y in FIG. 4; and,

FIG. 6 is a sectional view showing the completely mounted mirror.

Referring to the drawings, particularly to FIG. 6, there is shown an automobile back mirror 1 which is mounted on a stay 2 at one end thereof for angular adjusting movements through a known type of spherical joint. At the other end of the stay 2 there is formed a planar bottom 5 which is provided as shown in FIG. 5 with a pair of spaced lugs 3 and 4. A holding lever is removably attached at one end to the stay 2 by means of a pin 29 which extends through the lugs 3 and 4. As shown in FIGS. 1 and 2, the holding lever 24 is formed with a hook 25 which engages the pin 29. On a body panel 8, there is mounted a seat disc 6 which provides a seat 6a for the bottom 5 of the stay 2. The seat disc 6 is formed at the lower side with a suitable number of fastening pins 7 which are fitted respectively to apertures 9 in the panel 8 for securing the seat disc 6.

For mounting the mirror 1 to the panel 8, the panel 8 is formed with an opening 11 and a support 15 is mounted on the panel 8 at the opening 11. As shown in FIG. 1, the support plate 15 has a base portion 15a and is provided with three angularly spaced radially outwardly extending lugs 16 which lie in a plane offset from the base portion 15a in a direction perpendicular to the base portion 15a. Between respective two adjacent lugs, the support 15 is formed with segmental flanges 17 which are substantially coplanar with the base portion 15a. The distance of offset of the lugs 16 from the flanges 17 is such that the thickness of the panel 8 can be held between the lugs 16 and the flanges 17. For the reason which will be explained later, each of the flanges 17 has a peripheral length greater than the width of the lug 16.

As shown in FIG. 3, the opening 11 in the panel 8 is of a circular configuration with three angularly equi-spaced cut-off portions 11a. Each cut-off portion 11a is of such a size and configuration that the lug 16 on the support disc 15 can be passed therethrough as shown by phantom lines in FIG. 3. An arcuate edge 11b is thus left in the opening 11 between each two cut-off portions 11a. The arcuate edges 11b lie on a circle having a radius smaller than that of a circle on which the peripheral edges of the flanges 17 lie. The support disc 15 can be mounted in the opening 11 by passing the lugs 16 through the cut-off portions 11a of the opening 11 and rotating the disc 15 in the direction as shown by an arrow M in FIG. 3 until each lug 16 is placed between two cut-off portions 11a. Since the segmental flange 17 has a peripheral length greater than the width of the cut-off portion 11a, the former bridges the latter when the support disc 15 is thus rotated. Thus, the panel 8 is held between the lugs 16 and the flanges 17 and in this manner the support disc 15 can be mounted on the panel 8. The panel 8 may be provided at the inner surface with a pair of small projections 10 so that, when the support disc 15 is rotated, the lug 16 rides over one of the projections 10 and is then seated therebetween. The projections 10 may be helpful in determining the position of the support disc 15.

Referring to FIG. 1, it will be noted that the support disc 15 has a circular recess 15b formed with an aperture 20 for passing the holding lever 24 therethrough. In the vicinity of the aperture 20, there is formed a hole 19 for mounting a finger member 12. As shown in FIG. 1, the finger member 12 is formed at one end with a leg 13 and at the other end with a pawl 14. The leg 13 of the finger member 12 is inserted into the hole 19 of the support plate 15 so that the finger member 12 is movable between an operative position wherein it extends over the aperture 20 and a retracted position wherein it is retracted from the aperture.

The holding lever 24 is formed at the end opposite to the hook 25 with a transversely extending arm 28. A spring seat 22 having a slot 23 is engaged with the lever 24 by inserting the lever 24 into the slot 23 of the spring seat 22 whereby the spring seat 22 is supported by the arm 28 on the holding lever 24. A spring 21 is disposed between the support 15 and the spring seat 22 so as to bias the plate 15 in a direction away from the spring seat 22. The support 15 is formed with a spring guide 18 for receiving and guiding the upper end of the spring 21.

The holding lever 24 has a cut-off portion 26 formed at the side edge thereof beneath the hook 25. It should therefore be noted that the holding lever 24 is temporarily assembled with the support 15 by partly compressing the spring 21 and bringing the cut-off portion 26 of the lever 24 into engagement with the finger 12 which is at this instance in the operative position to form a temporary assembly as shown in FIG. 2. The assembly is then mounted on the panel 8 by holding the panel between the lugs 16 and the flanges 17 in the manner as previously described. Then, the stay seat 6 is mounted in position by inserting the pins 7 thereon into the corresponding holes 9 in the panel 8. The stay 2 is then connected with the holding lever 24 by bringing the pin 29 on the stay 2 into engagement with the hook 25 in the lever 24. At this instance, the bottom 5 of the stay 2 is placed at the position engageable with the seat 6a on the seat disc 6. Thereafter, the finger 12 is disengaged from the cut-off portion 26 in the holding lever 24 and moved into the retracted position whereby the lever 24 is forced downwards under the influence of the spring 21. Thus, the stay 2 is seated on the seat 6 at its bottom 5 as shown by solid lines in FIG. 6 and resiliently held in position.

It will be understood that the mirror mounting mechanism described above makes it possible to mount the mirror totally from one side of the panel. Further, whenever an external force is applied to the mirror or the stay, they can yield to the force as shown by phantom lines in FIG. 6 so that there will be least possibility that a person outside the automobile is injured by being hit by the mirror and/or the stay.

In the embodiment described above, the support plate 15 has three angularly spaced lugs 16 and three segmental flanges 17. However, the number of such lugs and flanges may be changed as desired. The support plate 15 may be made of any suitable material such as steel. One recommendable material for the support plate is a spring steel because the support plate can be firmly held on the panel through resilient actions applied to the panel by the lugs and the segmental flanges.

The invention has thus been shown and described with reference to a specific embodiment, however, it should be noted that the invention is in no way limited to the details of the illustrated structures but changes and modifications may be made without departing from the scope of the appended claims.

I claim:

1. Device for mounting a mirror on an automobile panel, said device comprising stay means having one end supporting the mirror, stay seat means adapted to be placed on one side of the panel and providing a seat for the other end of the stay means, plate-like support means having means engageable with said panel at the other side thereof, holding lever means having one end removably connected with said other end of the stay means and extending through said stay seat means, said panel and said support means, resilient biasing means between said holding lever means and support means to bias the holding lever means so that the stay means is forced against the stay seat means to hold the stay means on the stay seat means, said engageable means of said support means being in the form of at least one radially outwardly extending lug, said panel having opening means formed with at least one peripheral cut-off adapted for passing said lug therethrough so that the support means can be placed in position by passing it through said opening means in said panel with said lug aligned with the peripheral cut-off in the opening means and rotating it to have the lug engaged with said other side of the panel, said support means having a retractable finger which is adapted to be engaged with a cut-off formed in said holding lever means so that the holding lever means is temporarily assembled with the support means with the resilient biasing means in compressed condition.

2. Device in accordance with claim 1 in which said support means is provided with at least one segmental flange which is offset from said lug in a direction perpendicular to the support means by a distance corresponding to thickness of the panel, whereby the support means can be attached to the panel in an assembling operation by having the panel held between the lug and the flange.

3. Device in accordance with claim 2 in which said flange has a peripheral length sufficient to bridge the cut-off of the opening means in the panel.

4. Device in accordance with claim 2 which includes three angularly spaced lugs, and said segmental flange is formed between each two lugs.

5. Device in accordance with claim 2 in which said support plate is made of a resilient material.

* * * * *